United States Patent [19]

Bybee

[11] Patent Number: 4,951,727
[45] Date of Patent: Aug. 28, 1990

[54] LOW STORAGE-VOLUME CLOSURE DEVICE FOR CURVED SURFACE

[75] Inventor: Robert A. Bybee, San Diego, Calif.

[73] Assignee: The United States of America as represented by the Secretary of the Navy

[21] Appl. No.: 333,063

[22] Filed: Mar. 29, 1989

[51] Int. Cl.⁵ .............................................. E06B 3/00
[52] U.S. Cl. ..................................... 160/88; 160/352; 49/40; 244/129.4
[58] Field of Search .................... 160/88, 87, 114, 183, 160/210, 211, 352; 244/129.4, 129.5; 49/40

[56] References Cited
U.S. PATENT DOCUMENTS

| | | | |
|---|---|---|---|
| 2,519,386 | 8/1950 | Loving | 244/129.5 |
| 2,754,904 | 7/1956 | Provenzano | 244/129.5 X |
| 3,063,497 | 11/1962 | Bruecker | 160/352 |
| 3,571,977 | 3/1971 | Abeel | 244/129.5 X |
| 4,124,136 | 11/1978 | Bjelland et al. | 160/352 X |
| 4,739,955 | 4/1988 | Aquino et al. | 244/129.4 |

Primary Examiner—David M. Purol
Attorney, Agent, or Firm—Harvey Fendelman; Thomas Glenn Keough; Peter A. Lipovsky

[57] ABSTRACT

A flexible closure device takes a generally arcuate shape in a closed position to conform to a curved surface when closing an opening in the surface. The device takes a generally planar shape when in an open position thereby occupying a low amount of storage space.

20 Claims, 3 Drawing Sheets

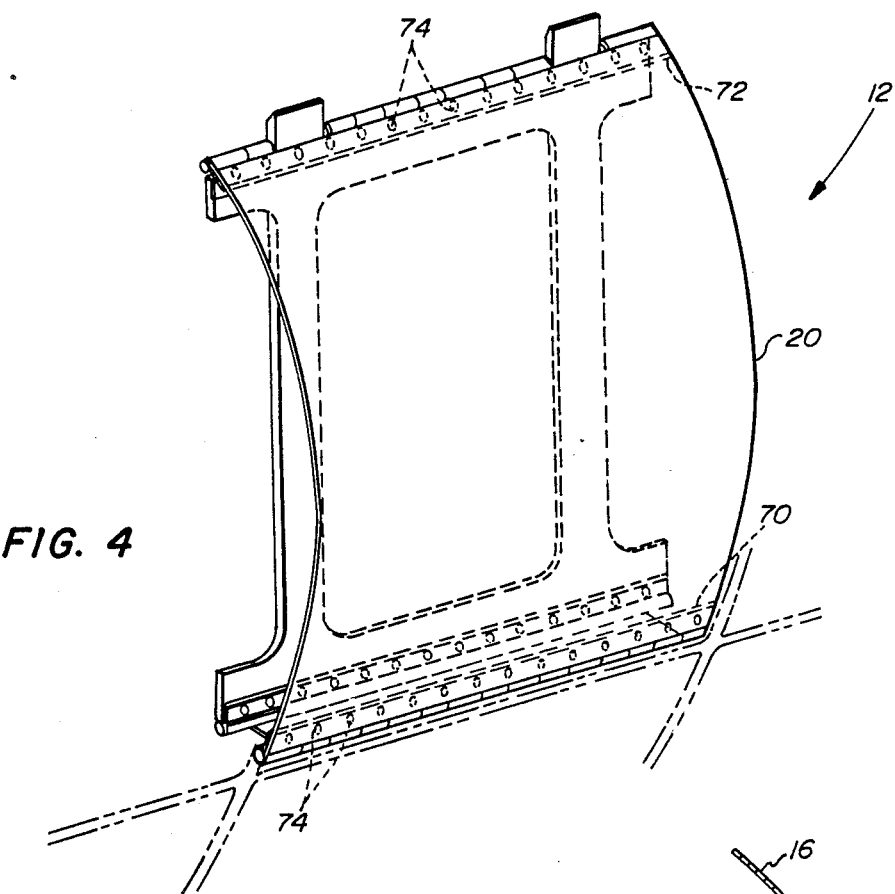
FIG. 4
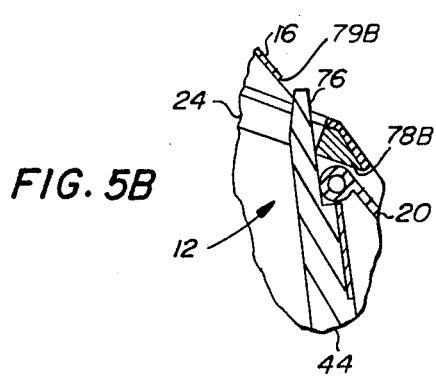
FIG. 5A
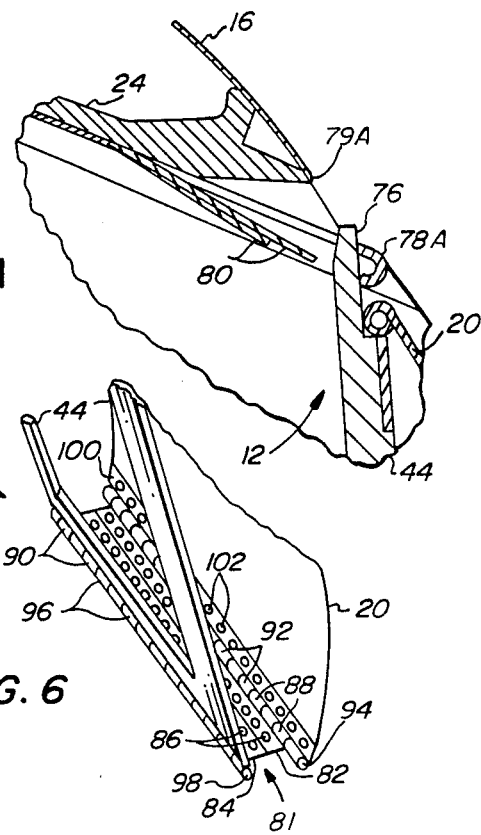
FIG. 5B
FIG. 6

LOW STORAGE-VOLUME CLOSURE DEVICE FOR CURVED SURFACE

Statement of Government Interest

The invention described herein may be manufactured and used by or for the Government of the United States of America for governmental purposes without the payment of any royalties thereon or therefor.

BACKGROUND OF THE INVENTION

1. Field of the Invention

This invention relates broadly to the field of closure devices. More specifically, the invention pertains to flexible closure devices. By further characterization, the invention relates to a flexible closure device that takes a generally planar shape in an open position and that takes a generally arcuate shape in a closed position thereby conforming to a curved surface when closing an opening in the surface.

2. Description of the Prior Art

Aerospace vehicles commonly have non-planar, curved surfaces to provide the vehicle with an aerodynamically efficient, structurally sound exterior. It is often desirable to provide openings in these surfaces so that, for example, cargos may be loaded and unloaded, instruments extended and retracted, payloads stored and dropped and the like. For the vehicle to maintain aerodynamic efficiency, these openings require a closure that conforms to the curved exterior surface of the vehicle.

In the past, closures designed to meet this requirement have been bulky structures. This bulkiness, most apparent when the closure is in an open position, is due to the necessary arcuate shape of the device.

In instances where an object such as a cargo or payload is stored such that the one side of the object makes up a portion of the periphery of a vehicle's curved surface, the jettisoning or dropping of the object will leave an undesirable discontinuity in the vehicle's exterior surface. Once the vehicle is aloft, this discontinuity can only be filled by a closure device stored previously on the vehicle. A device that has the desired surface conformity can occupy a large volume of the vehicle's storage space.

SUMMARY OF THE INVENTION

The present invention solves the foregoing problem by providing a closure that occupies a low volume when stored and that conforms to a curved surface when closing an opening in the surface.

The invention is particularly useful where an object that previously made up a part of a vehicle's exterior surface has been dropped or jettisoned from the vehicle. The void left in the surface by the discarded object may be filled by a closure device stored earlier on the vehicle. Furthermore, the device of the invention may be utilized in other instances where a low storage-volume closure for a curved surface is desired, such as for vehicles other than aircraft, including land vehicles and ships, and for stationary structures such as buildings and space stations.

The invention features a flexible outer door member that is attached to a structure associated with a curved surface. The flexible member is positioned at an opening in the surface and is pivotable between an open configuration in which the member is stored in a generally planar shape and a closed configuration in which the member assumes a generally arcuate shape that conforms to and closes the opening in the curved surface.

The flexible member is pivotally attached on opposite ends, with one end being attached to a hinge plate that is fastened to the structure. The other end of the member is pivotally attached to a support frame. This support frame extends from the flexible member to the hinge plate, where the frame is pivotally attached. By this arrangement, the flexible member flattens when tilted in one direction and bows when tilted in the opposite direction. The support frame adds rigidity to the member and may include tabs that engage the structure to control the degree of bowing of the member as well as to facilitate locking the member in place.

The closure device of the invention may be provided with self-closing capability by selecting a flexible member of a suitably resilient material that is inherently biased to assume a preselected arcuate shape. The member could then "spring" from the generally planar, open configuration to the generally arcuate, closed configuration.

Where a spring biased self closing device might be considered undesirable, such as where external aerodynamic forces are great and/or where potential shelf life is long, other means may be used to position the closure device from open to closed positions. For example, in the case where an object that makes up a part of a vehicle's exterior surface will be dropped or jettisoned, a lanyard may be attached between a closure device, stored behind the object, and the object to be ejected, so that the ejection of the object urges the closure to the closed position. In this instance the lanyard should be designed to pull free, such as when a predetermined tension in the lanyard is achieved.

OBJECTS OF THE INVENTION

It is an object of the invention to provide a closure for an opening in a non-planar surface.

Another object of the invention is to provide a closure device for an opening in a non-planar surface in which said closure device occupies a low storage-volume when in an open position.

Yet another object of the invention is to provide a closure device for an opening in a non-planar surface in which said closure device substantially conforms to said non-planar surface when closing said opening and in which said closure device occupies a low storage-volume when in an open position.

Other objects, advantages and new features of the invention will become apparent from the following detailed description of the invention when considered in conjunction with the accompanied drawings.

BRIEF DESCRIPTION OF THE DRAWINGS

FIG. 4 is an alternate embodiment of the closure device of the invention.

FIG. 5A is a side detailed view of a lock mechanism for locking the flexible member of the invention in place.

FIG. 5B illustrates a side detail of an alternative lock mechanism.

FIG. 6 focuses on yet a further embodiment of the invention.

DESCRIPTION OF THE PREFERRED EMBODIMENT

Figure 1:
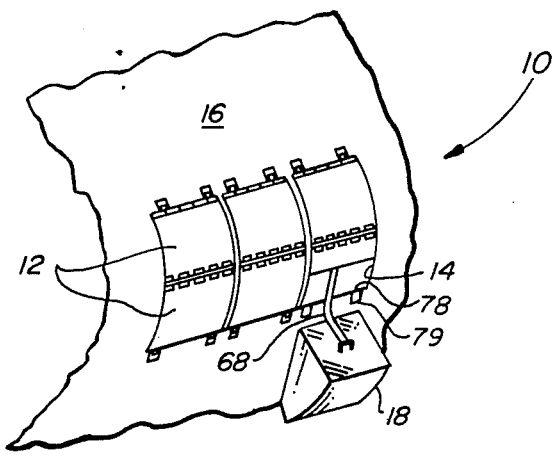
FIG. 1 is a view of a portion of a curved surface containing a plurality of the low storage-volume closure devices of the invention.

Referring to FIG. 1, a plurality 10 of individual low storage-volume closure devices 12 of the invention are shown. Plurality 10 represents a typical array of closure devices 12, however other arrangements of the devices, in singular or plural form, may be utilized as requirements demand.

As will be discussed in greater detail, each closure device 12 is hinged to substantially close an opening 14 in a non-planar surface 16, such as the curved surface of an aerospace vehicle, for example. A need for such a device exists, for instance, where an object 18 that originally made up a portion of the periphery of curved surface 16 has been jettisoned or dropped leaving opening 14 to disrupt the smooth flow of the ambient over the surface. To close opening 14, as well as to provide substantial surface conformity with curved surface 16, device 12 may be utilized.

Figure 2:
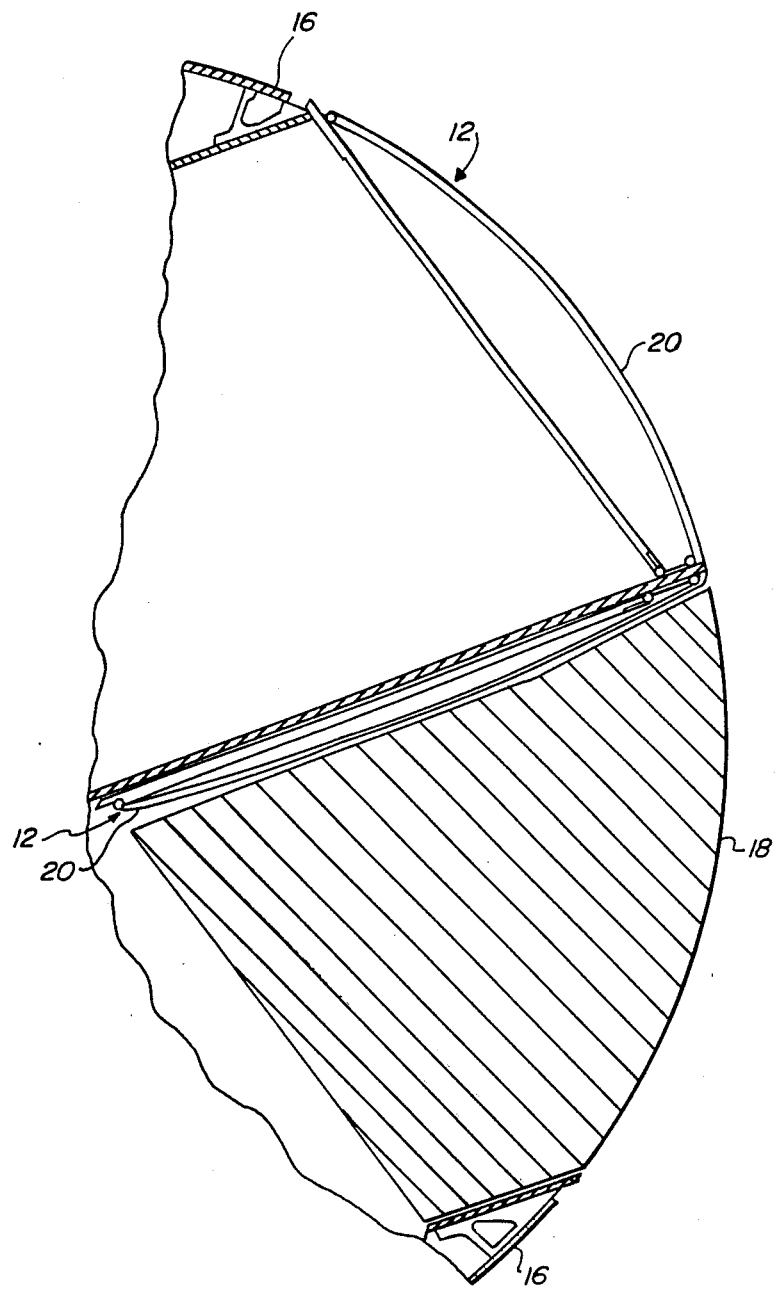
FIG. 2 is a cross-section of two of the closure devices of the invention illustrating open and closed positions of the device.

Referring to FIGS. 1 and 2, one can better understand implementation of the invention. In FIG. 2, cross-sections of two closure devices 12 are shown. The closure device in the lower half of FIG. 2 is shown in an open position. In this open position, flexible member 20 is characterized by a generally planar shape, designated as the open configuration of member 20. While in this open configuration, flexible member 20 occupies a low volume of storage space, permitting, for example, additional or bulkier objects, such as object 18, to consume the additionally "made" space.

The closure device in the upper half of FIG. 2 illustrates the closed position of the device in which flexible member 20 closes an opening left in surface 16 such as that caused by the discarding of an object like object 18. In this position, flexible member 20 assumes a generally arcuate shape, denoted as the closed configuration, that conforms to surface 16 to provide a smooth boundary contiguous with the surface.

Figure 3:
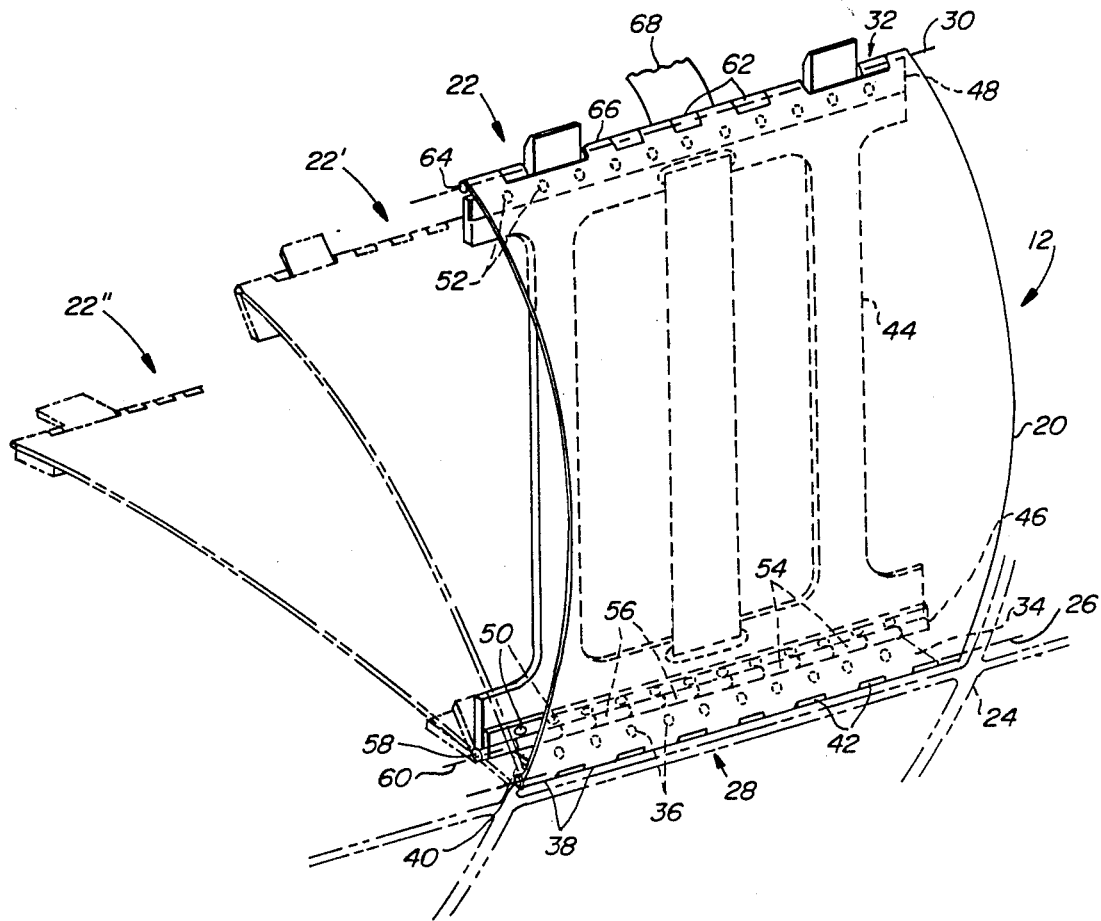
FIG. 3 is an isometric detailed view in which opened, intermediate and closed positions of the invention are depicted.

In FIG. 3, device 12 of the invention is depicted in a closed position 22, an intermediate position 22' and an open position 22''.

Referring to FIG. 3, flexible member 20 of device 12 is attached to a structure 24 having a non-planar curved surface, such as surface 16 shown in FIGS. 1 and 2. Member 20 is attached to structure 24 for pivotal movement about a primary axis 26 at an end 28 of the member and for pivotal movement about a secondary axis 30 at an end 32 of the member.

End 28 attaches to structure 24 by way of a hinge plate 34 that is fastened to the structure by a conventional technique such as fasteners 36. In a preferred embodiment of the invention, flexible member 20 is made of a material, such as 304 steel, that permits a series of axially aligned tubular knuckles to be formed directly in the member. In this embodiment, knuckles 38 are formed directly in end 28 of member 20. These knuckles are joined by a pivot pin 40 to a series of knuckles 42 connected to one end of hinge plate 34.

Second end 32 of flexible member 20 is attached to structure 24 by way of a support frame 44. A pair of hinge leafs 46 and 48 are individually attached to opposite ends of frame 44 by a conventional means such as the fasteners 50 and 52, respectively. Each of the hinge leafs has a series of axially aligned tubular knuckles.

Knuckles 54 of hinge leaf 46 are joined with a second series of knuckles 56 in hinge plate 34 by second pin 58. This arrangement permits frame 44 to pivot about third axis 60.

Knuckles 62 of hinge leaf 48 are joined by a third pivot pin 64 with a series of axially aligned tubular knuckles 66 formed in second end 32 of flexible member 20.

Referring again to FIG. 3, operation of closure device 12 can be more readily understood. In the operation of device 12, flexible member 20 pivots about primary axis 26, causing the distance between primary axis 26 and secondary axis 30 to change. As flexible member 20 is positioned from its open configuration, shown in position 22'', towards its closed configuration, shown in position 22, the distance between primary axis 26 and secondary axis 30 decreases. This decrease causes a gradual bending of flexible member 20, seen in an early stage in intermediate position 22', to eventually take the generally arcuate shape shown in closed position 22.

Conversely, as flexible member 20 is positioned from its closed configuration, shown in position 22, towards its open configuration, shown in position 22'', the distance between primary axis 26 and secondary axis 32 increases. This increase causes flexible member 20 to take a generally planar shape.

When closure 12 is stored in the open position, the open configuration of flexible member 20 occupies little storage volume. As discussed above, the generally planar shape of stored flexible member 20 permits, for example, larger or additional objects to be stored in conjunction with device 12.

Referring to FIGS. 1, 2 and 3, when closure device 12 is in closed position 22, the closed configuration of flexible member 20 substantially closes opening 14 in curved surface 16 as well as substantially conforms to surface 16 to provide aerodynamic continuity over the surface. For surfaces of varying degrees of curvature, the curvature of flexible member 20 can be selectively altered such as by increasing or decreasing the distance between primary axis 26 and third axis 60. An increase in this distance will have the effect of increasing the curvature of flexible member 20.

Flexible member 20 can be biased to self assume its closed configuration by selecting the member of an inherently springy material pre-shaped to a desired curved form. Number 304 steel treated in accordance with established techniques could serve this purpose. Where the inherent resiliency of flexible member 20 is considered undesirable, either because the member may be stored in its open configuration for a substantial length of time, thereby being susceptible to relaxation, or where ambient pressure on the member may be substantial or in other cases where the resiliency of member 20 alone might be considered unreliable, additional means of urging flexible member 20 between its open configuration and closed configuration may be used.

An example of such an additional means is shown in FIGS. 1 and 3 and takes the form of a lanyard 68 attached between object 18 and support frame 44 of closure device 12. The expulsion of object 18 from surface 16 will draw lanyard 68 taut thereby urging flexible member 20 to the closed configuration, shown in the upper half of FIG. 2. Where lanyard 68 is utilized, the lanyard should be designed to separate, such as at a preselected tension, to separate object 18 from device 12.

Referring to FIG. 4 an embodiment of the invention without the incorporation of a lanyard 68 is shown. This embodiment could be used in the case where the inherent resiliency of flexible member 20 was depended upon alone to bias device 12 to the closed position or in which other means were used to close the device. In the embodiment shown in FIG. 4, flexible member 20 has hinge leafs, 70 and 72, individually attached to its ends by a conventional means such as fasteners 74.

This embodiment could be used in cases in which flexible member 12 is constructed of a material that does not readily lend itself to the working required to form knuckles within its ends. Some of the modern day "composites", as they are known to those skilled in the aerospace arts, would fit this category. In instances in which composites are used, they could be precurved to assume a desired closed configuration.

Referring now to FIGS. 5A and 5B, two embodiments are shown by which flexible member 20 may be held in the closed configuration shown in position 22 of FIG. 1 and in the upper half of FIG. 2. In FIGS. 5A and 5B, and referring to FIGS. 1 and 2, tabs 76, one of which is shown in FIGS. 5A and 5B for clarity, are made a part of support frame 44. In closed position 22, the tabs reach stoppers attached to structure 24, to retain flexible member 20 at this position. In FIGS. 5A and 5B, respectively, it can be seen that tabs 76 reach stoppers 78A bordering recess 79A and stoppers 78B bordering recess 79B. In FIG. 1, a generic stopper 78 is shown along one side of a recess 79 defined in surface 16.

FIG. 5A shows the incorporation of leaf springs 80, one set of two shown, that serve as one way gates for tabs 76 by permitting them to travel to stopper 78A but preventing the tabs and attached flexible member 20 from retreating from this position. FIG. 5B illustrates a locking mechanism without leaf springs that can be used where arcuate shaped flexible member 20 remains in the closed position by virtue of its own resiliency. The locking mechanisms shown in FIGS. 5A and 5B are, of course, offered by way of example as other schemes of retaining closure device 12 in a desired position may be devised.

FIG. 6 illustrates an alternative embodiment of the invention in which a hinge plate 81 is comprised of two hinge leafs 82 and 84 held to a structure, not shown, by conventional fasteners 86. Hinge leafs 82 and 84 each have a series of axially aligned tubular knuckles 88 and 90, respectively. Knuckles 88 of hinge leaf 82 are joined with knuckles 92 of flexible member 20 by a pin 94, with knuckles 90 of hinge leaf 84 being joined with knuckles 96 of support frame 44 by a pin 98.

The two-hinge-leaf embodiment of hinge plate 81 may be utilized with a flexible member having knuckles formed directly in its ends, as does flexible member 20 of FIG. 3, or may be used with a flexible member having hinge leafs attached at its ends, such as flexible member 20 in FIG. 6 shown with a hinge leaf 100 being attached by fasteners 102 at one end thereof.

A divided hinge plate such as that shown in FIG. 6 could be useful for a number of reasons, such as component availability, ease of manufacturing, ease of installation, and for adjustment reasons where fine tuning of the position of closure device 12 is considered desirable.

Although those skilled in the art will realize that a variety of applications and embodiments of the invention are possible some of these will be illustrated for example purposes.

As has been discussed, flexible members of certain substances permit hinge knuckles to be formed directly in the member itself. Of course this technique is likewise applicable to hinge leafs made of the same or similar materials. Likewise, hinges could be rolled in the supporting link.

Further, hinge leafs could be independently constructed and adhered to the flexible member and supporting links by way of adhesives, riveting, spot welding or the like.

Where external pressures on the flexible member are relatively high, the link supporting the member could be additionally trussed or strengthened so as to add additional strength to the member.

As previously mentioned, there are a variety of instances besides that of ejecting an exterior surface object from an aerospace vehicle where the low storage-volume closure device of the invention could be used. For example, the device could be useful in permitting a mechanic access to the interior of an object covered by a curved exterior surface. Further, in cases in which the closure device of the invention is employed with hovering objects, the device could be selectively opened and closed to permit sensing instruments to peer or probes to sample. These applications of the invention are offered by way of example as the invention may, of course, be utilized in other applications.

Obviously, those skilled in the art will realize that these and other modifications and variations of the invention are possible in light of the above teachings. Therefore, it is to be understood that within the scope of the following claims the invention may be practiced otherwise than as specifically described.

What is claimed is:

1. A closure for substantially closing an opening in an non-planar surface with said closure being in substantial conformity with said non-planar surface when closing said opening comprising:
    a flexible member having a closed configuration and an open configuration, said closed configuration being different from said open configuration; and
    means for positioning said flexible member between said closed configuration and said open configuration so that when said flexible member is in said closed configuration it substantially closes said opening in said non-planar surface and substantially conforms to said nonplanar surface.

2. A closure as defined in claim 1 wherein said flexible member is generally planar when in said open configuration.

3. A closure as defined in claim 2 wherein said flexible member is intrinsically biased to said closed configuration.

4. A closure as defined by claim 2 wherein said non-planar surface is generally arcuate.

5. A closure as defined in claim 4 wherein said flexible member is intrinsically biased to said closed configuration.

6. A closure as defined in claim 2 or 4 wherein:
    said flexible member has a first end and a second end;
    said non-planar surface is attached to a structure; and
    said means for positioning said flexible member comprises first means, coupled to said first end of said flexible member, for attaching said flexible member to said structure and second means, coupled to said second end of said flexible member, for effectively attaching said second end of said flexible member to said structure.

7. A closure as defined in claim 6 in which:
said first means has a first end and a second end;
said second means has a first end and a second end; and
said first means is fixedly attached to said structure with the first end of said flexible member being pivotally attached to said first end of said first means, said second end of said first means being pivotally attached to said first end of said second means with said second end of said second means being pivotally attached to said second end of said flexible member so that rotation of said flexible member with respect to said structure about said first end of said flexible member positions said flexible member between said open and closed configurations.

8. A closure as defined in claim 7 further including means for locking said flexible member in said closed configuration, said means for locking including a portion thereof attached to said structure with said means for locking including another portion thereof connected to said second means for attaching said flexible member to said structure.

9. A closure as defined in claim 6 in which said first means for attaching said flexible member to said structure includes:
a hinge plate attached to said structure and having a series of axially aligned tubular knuckles connected at a first side thereof;
a series of axially aligned tubular knuckles connected at the first end of said flexible member; and
a pivot pin, where
the knuckles at the first end of said hinge plate are interjoined with the knuckles at the first end of said flexible member by said pivot pin.

10. A closure as defined in claim 9 in which said second means for attaching said flexible member to said structure includes:
a support frame;
a pair of hinge leafs each having a series of axially aligned tubular knuckles, one of said pair of hinge leafs being attached at a first end of said support frame with the second of said pair of hinge leafs being attached to a second end of said support frame;
a series of axially aligned tubular knuckles connected at the second end of said flexible member;
a series of axially aligned tubular knuckles connected at a second side of said hinge plate;
a second pivot pin; and
a third pivot pin, where
the knuckles at the first end of said support frame are interjoined with the knuckles formed in the second end of said hinge plate by said second pivot pin and the knuckles at the second end of said support frame are interjoined with the knuckles formed at the second end of said flexible member by said third pivot pin.

11. A closure as defined in claim 10 in which said series of axial knuckles at the first and second ends of said flexible member are formed, respectively, in an edge of said first and second ends of said flexible member.

12. A closure as defined in claim 10 in which said series of axial knuckles at the first and second ends of said flexible member are formed in individual hinge leafs, one of said hinge leafs being attached at the first end of said flexible member and another of said hinge leafs being attached at the second end of said flexible member.

13. A closure as defined in claim 10 in which said hinge plate includes two hinge leafs each having a series of axially aligned tubular knuckles, said hinge leafs being disposed side by side with said knuckles being on opposite sides.

14. A closure for substantially closing an opening in a curvilinear surface with said closure being in substantial conformity with said curvilinear surface when closing said opening comprising:
a flexible member having a closed configuration and an open configuration, said flexible member being generally planar when in said open configuration and being generally curvilinear when in said closed configuration;
a structure attached to said curvilinear surface; and
means coupled to said flexible member and to said structure for positioning said flexible member between said closed configuration and said open configuration so that when said flexible member is in said closed configuration it substantially closes said opening in said curvilinear surface and substantially conforms to said curvilinear surface.

15. A closure as defined in claim 14 in which said flexible member is intrinsically biased to said closed configuration.

16. A closure as defined in claim 14 in which said means for positioning includes means for pivoting said flexible member between said closed configuration and said open configuration, said flexible member having a first end and a second end with said means for pivoting being attached to said structure and to said flexible member at said first end of said flexible member and at said second end of said flexible member opposite said first end.

17. A closure as defined in claim 16 in which said means for pivoting includes a hinge plate having a first end and a second end and a support frame having a first end and a second end, said hinge plate being fixedly attached to said structure with said flexible member being pivotally attached at said first end thereof to said first end of said hinge plate, said second end of said hinge plate being pivotally attached to said first end of said support frame, with said second end of said support frame being pivotally attached to said flexible member at said second end thereof so that rotation of said flexible member about said first end thereof will position said flexible member between said open and closed configurations.

18. A closure as defined in claim 17 further including means for locking said flexible member in said closed configuration, a portion of said locking means being attached to said structure and another portion of said locking means being connected to said support frame.

19. A flexible faring comprising:
a flexible member having a first end and a second end and being configurable between a generally planar configuration and a generally curved configuration;
a hinge plate having a first end and a second end; a structure attached to said hinge plate with said hinge plate being pivotally attached at said first end thereof to said first end of said flexible member; and a generally planar support frame pivotally attached to a second end of said flexible member and pivotally attached to a second end of said hinge plate, where rotation of said flexible member and said support frame with respect to said hinge plate configures said flexible member between said generally planar configuration and said generally curved configuration.

20. A closure as defined in claim 19 in which said hinge plate includes two hinge leafs.

* * * * *